(12) United States Patent
Jackson et al.

(10) Patent No.: US 6,586,118 B2
(45) Date of Patent: Jul. 1, 2003

(54) BONDED NIOBIUM SILICIDE AND MOLYBDENUM SILICIDE COMPOSITE ARTICLES USING SEMI-SOLID BRAZES

(75) Inventors: Melvin Robert Jackson, Niskayuna, NY (US); Bernard Patrick Bewlay, Schenectady, NY (US); Ji-Cheng Zhao, Niskayuna, NY (US)

(73) Assignee: General Electric Company, Niskayuna, NY (US)

(*) Notice: Subject to any disclaimer, the term of this patent is extended or adjusted under 35 U.S.C. 154(b) by 0 days.

(21) Appl. No.: 09/867,489

(22) Filed: May 30, 2001

(65) Prior Publication Data

US 2003/0002988 A1 Jan. 2, 2003

(51) Int. Cl.$^7$ .............................. B32B 15/00; B23K 1/00
(52) U.S. Cl. ........................ 428/662; 228/101; 228/227; 228/262.7; 228/262.8; 228/262.9; 428/636; 428/641; 428/656; 428/660; 428/663; 428/666; 428/668; 428/669; 428/670; 428/672
(58) Field of Search ................................ 428/662, 636, 428/641, 656, 660, 663, 666, 668, 669, 670, 672; 228/101, 227, 262.7, 262.8, 262.9; 416/223 R, 241 R

(56) References Cited

U.S. PATENT DOCUMENTS

| | | |
|---|---|---|
| 3,633,110 A | 1/1972 | Sullivan et al. |
| 3,736,638 A | 6/1973 | Stone, Jr. |
| 3,909,917 A * | 10/1975 | Lebedev et al. .............. 228/227 |
| 4,611,752 A | 9/1986 | Jahnke |
| 4,642,863 A | 2/1987 | Schulz |
| 5,071,059 A | 12/1991 | Heitman et al. |
| 5,072,871 A | 12/1991 | Moracz et al. |
| 5,099,573 A | 3/1992 | Krauss et al. |
| 5,626,462 A | 5/1997 | Jackson et al. |
| 5,640,767 A | 6/1997 | Jackson et al. |
| 5,820,337 A | 10/1998 | Jackson et al. |

* cited by examiner

Primary Examiner—Robert R. Koehler
(74) Attorney, Agent, or Firm—Robert P. Santandrea; Noreen C. Johnson

(57) ABSTRACT

An airfoil having a melting temperature of at least about 1500° C. and comprising a first piece and a second piece joined by a braze to the first piece. The first piece comprises one of a first niobium-based refractory metal intermetallic composite and a first-based refractory metal intermetallic composite, and the second piece comprises one of a second niobium-based refractory metal intermetallic composite and a second molybdenum-based refractory metal intermetallic composite. The braze joining the first piece to the second piece is a semi-solid braze that comprises a first component and a second component. The first component of the semi-solid braze comprises a first element and a second metallic element, wherein the first element is one of titanium, palladium, zirconium, niobium, germanium, silicon, and hafnium, and the second metallic element is a metal selected from the group consisting of titanium, palladium, zirconium, niobium, hafnium, aluminum, chromium, vanadium, platinum, gold, iron, nickel, and cobalt, the second metallic element being different from the first element. The second component has a melting temperature of at least about 1450° C. and comprises one of niobium, molybdenum, titanium, hafnium, silicon, boron, aluminum, tantalum, germanium, vanadium, tungsten, zirconium, and chromium. This abstract is submitted in compliance with 37 C.F.R. 1.72(b) with the understanding that it will not be used to interpret or limit the scope of or meaning of the claims.

72 Claims, 3 Drawing Sheets

BONDED NIOBIUM SILICIDE AND MOLYBDENUM SILICIDE COMPOSITE ARTICLES USING SEMI-SOLID BRAZES

BACKGROUND OF THE INVENTION

This application generally relates to composite articles that are joined together using brazes. More particularly, the invention described herein relates to bonded niobium-based silicide and molybdenum-based silicide composite articles that are joined together using semi-solid brazes.

Nickel (Ni)-based superalloys have been used as jet engine materials for many years. The surface temperatures at the hottest locations of state-of-the-art jet engine turbine airfoils now approach 1150° C., which is approximately 85% of the melting temperatures of Ni-based superalloys. Niobium (Nb) and molybdenum (Mo) based refractory metal intermetallic composites (hereinafter referred as "Nb-based RMICs" and "Mo-based RMICs," respectively) have much higher potential application temperatures, provided that they can be used at approximately 80% or more of their melting temperatures, which are generally greater than about 1700° C.

Complex silicide-based RMICs made from Nb—Si—Ti—Hf—Cr—Al alloys or Mo—Si—B—Cr alloys show high promise to become the next generation turbine materials with a long term, high-temperature capability that is significantly higher than that of current Ni-based superalloys. Because of their high melting temperatures, however, direct casting of hollow engine components with cooling channels from these Nb- and Mo-based RMICs is expected to be very difficult. At such high temperatures, very few materials can serve as casting cores and molds without experiencing creep, cracking, or reactions with the molten metals (thus contaminating the melt and degrading the cores). One potential alternative technique for the manufacture of complex-shaped components (e.g. airfoils) with cooling channels is to bond together, typically using a braze, two or more structural members that have been machined to the appropriate shapes. Currently, however, no such braze materials exist for these Nb- and Mo-based RMICs.

It is known in the art to make hollow components, such as turbine blades, by joining and bonding halves or multiple pieces together. However, the prior-art braze materials that have been developed for Ni-based or Fe-based alloys are not suitable for use with the new Nb- and Mo-based silicide composites, which have very different alloy compositions and much higher working temperatures. Detrimental interactions are known to occur between nickel brazes, for example, and Nb-based RMICs.

Accordingly, there is a need in the art for improved high temperature composite articles that are joined together using brazes.

BRIEF SUMMARY OF THE INVENTION

The present invention meets this and other needs by providing articles formed from Nb- and Mo-based RMICs articles that are joined together by a semi-solid braze. Semi-solid brazes for joining Nb- and Mo-based RMICs are also disclosed.

Accordingly, one aspect of the invention is to provide an article having a melting temperature of at least about 1500° C. The article comprises a first piece and a second piece joined by a braze to the first piece. The first piece comprises one of a first Nb-based RMIC and a first Mo-based RMIC, wherein the first Nb-based RMIC comprises titanium, hafnium, silicon, chromium, and niobium, and the first Mo-based RMIC comprises molybdenum, silicon, and at least one of chromium and boron. The second piece comprises one of a second Nb-based RMIC and a second Mo-based RMIC, wherein the second Nb-based RMIC comprises titanium, hafnium, silicon, chromium, and niobium, and the second Mo-based RMIC comprises molybdenum, silicon, and at least one of chromium and boron.

A second aspect of the invention is to provide an airfoil having a melting temperature of at least about 1500° C. The airfoil comprises a first piece and a second piece joined by a braze to the first piece. The first piece comprises one of a first Nb-based RMIC and a first Mo-based RMIC, wherein the Nb-based RMIC comprises titanium, hafnium, silicon, chromium, and niobium, and the first Mo-based RMIC comprises molybdenum, silicon, and at least one of chromium and boron. The second piece comprises one of a second Nb-based RMIC and a second Mo-based RMIC, wherein said second Nb-based RMIC comprises titanium, hafnium, silicon, chromium, and niobium, and the second Mo-based RMIC comprises molybdenum, silicon, and at least one of chromium and boron.

A third aspect of the invention is to provide an airfoil having a melting temperature of at least about 1500° C. and comprising a first piece and a second piece joined by a braze to the first piece. The first piece comprises one of a first Nb-based RMIC and a first Mo-based RMIC, wherein the Nb-based RMIC comprises titanium, hafnium, silicon, chromium, and niobium, and the first Mo-based RMIC comprises molybdenum, silicon, and at least one of chromium and boron. The second piece comprises one of a second Nb-based RMIC and a second Mo-based RMIC, wherein the second Nb-based RMIC comprises titanium, hafnium, silicon, chromium, and niobium, and the second Mo-based RMIC comprises molybdenum, silicon, and at least one of chromium and boron. The braze joining the first piece to the second piece is a semi-solid braze that comprises a first component and a second component. The first component of the semi-solid braze is an alloy having a melting temperature of up to 1430° C. and comprising a first element and a second metallic element, wherein the first element is one of titanium, palladium, zirconium, niobium, germanium, silicon, and hafnium, the second metallic element is one of titanium, palladium, zirconium, niobium, hafnium, aluminum, chromium, vanadium, platinum, gold, iron, nickel, and cobalt, the second metallic element being different from the first element. The second component has a melting temperature greater than 1450° C. and comprises at least one of niobium, molybdenum, titanium, hafnium, silicon, boron, aluminum, tantalum, germanium, vanadium, tungsten, zirconium, and chromium.

A fourth aspect of the invention is to provide a turbine assembly having at least one component. The at least one component has a melting temperature of at least about 1500° C. and comprises a first piece and a second piece joined by a braze to the first piece. The first piece comprises one of a first Nb-based RMIC and a first Mo-based RMIC, wherein the Nb-based RMIC comprises titanium, hafnium, silicon, chromium, and niobium, and the first Mo-based RMIC comprises molybdenum, silicon, and at least one of chromium and boron. The second piece comprises one of a second Nb-based RMIC and a second Mo-based RMIC, wherein the second Nb-based RMIC comprises titanium, hafnium, silicon, chromium, and niobium, and the second Mo-based RMIC comprises molybdenum, silicon, and at least one of chromium and boron. The braze joining the first piece to the second piece is a semi-solid braze that comprises a first component and a second component. The first component of the semi-solid braze is an alloy comprising a first element and a second metallic element, wherein the first element is one of titanium, palladium, zirconium, niobium, germanium, silicon, and hafnium, the second metallic element is one of titanium, palladium, zirconium, niobium, hafnium, aluminum, chromium, vanadium, platinum, gold, iron, nickel, and cobalt, the second metallic element being different from the first element. The second component has a melting temperature of at least about 1450° C. and comprises at least one niobium, molybdenum, titanium, hafnium, silicon, boron, aluminum, tantalum, germanium, vanadium, tungsten, zirconium, and chromium.

Finally, a fifth aspect of the invention is to provide a method of making an article having a melting temperature of at least about 1500° C. and comprising a first piece and a second piece that are joined together by a braze. The first piece and second piece each comprise one of a Nb-based RMIC and a Mo-based RMIC, wherein the Nb-based RMIC comprises titanium, hafnium, silicon, chromium, and niobium and the Mo-based RMIC comprises molybdenum, silicon, and at least one of chromium and boron. The method comprises the steps of: providing the first piece and the second piece such that the first piece and the second piece form a an interface therebetween; providing a braze to the interface between the first piece and the second piece, the braze being a semi-solid braze that comprises a first component and a second component, the first component having a first component melting temperature of less than 1430° C. and comprising a first element and a second metallic element, the first element being one of titanium, palladium, zirconium, niobium, germanium, silicon, and hafnium, and the second metallic element being one of titanium, palladium, zirconium, niobium, hafnium, aluminum, chromium, vanadium, platinum, gold, iron, nickel, and cobalt and being different from the first element, and the second component having a second component melting temperature of at least about 1450° C. and comprising at least one of niobium, molybdenum, titanium, hafnium, silicon, boron, aluminum, tantalum, germanium, vanadium, tungsten, zirconium, and chromium; heating the first piece, the second piece, and the braze to a first temperature for a first predetermined hold time, the first temperature being at least about 20° C. above the first component melting temperature and less than the second component melting temperature; and further heating the first piece, the second piece, and the braze up to about 1450° C. for a second predetermined hold time, thereby joining the first piece and the second piece at the interface and forming the article.

These and other aspects, advantages, and salient features of the present invention will become apparent from the following detailed description, the accompanying drawings, and the appended claims.

LIST OF FIGURES

DETAILED DESCRIPTION OF THE INVENTION

Figure 1:
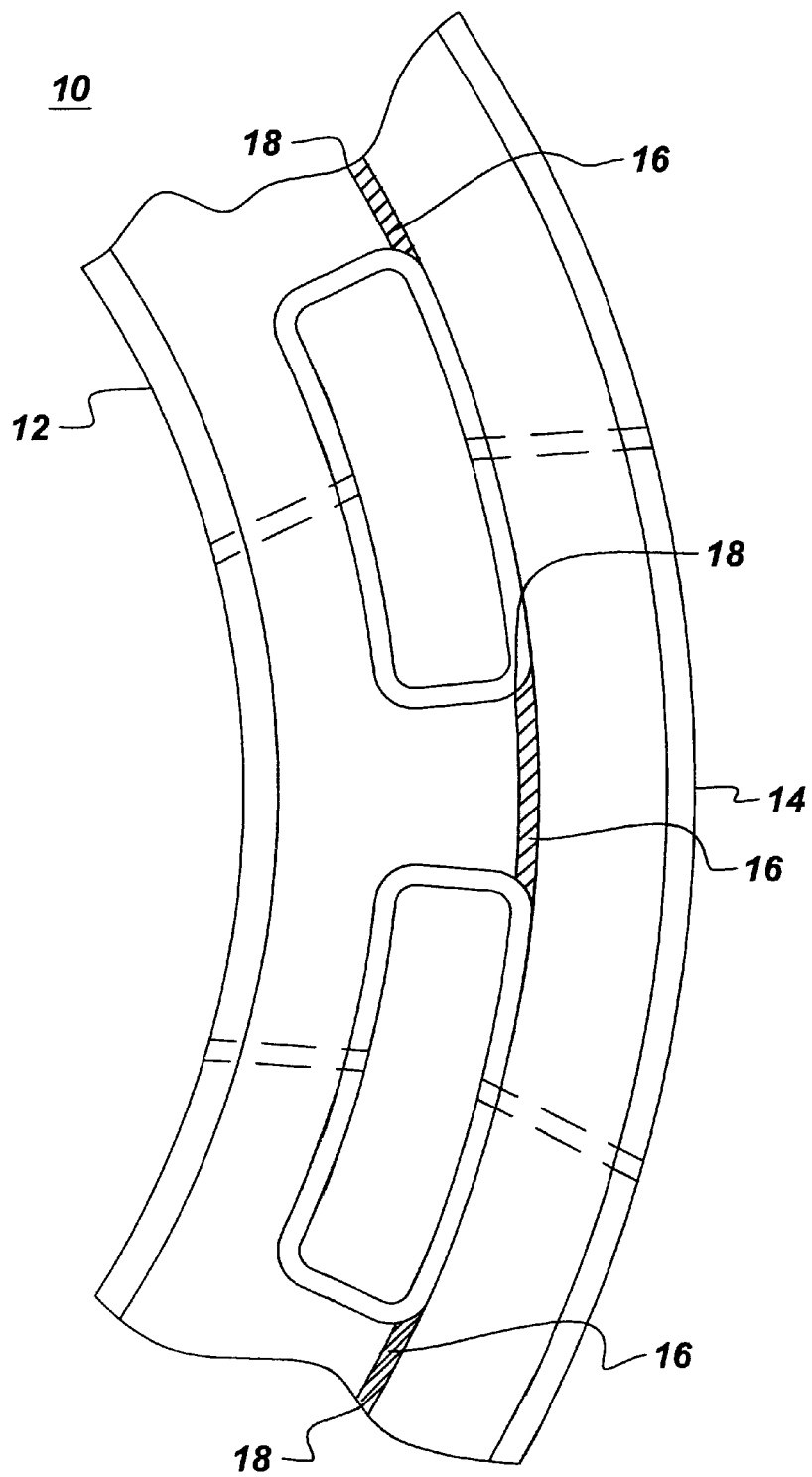
FIG. 1 is a schematic illustration of a brazed article in accordance with one embodiment of the present invention.

In the following description, like reference characters designate like or corresponding parts throughout the several views shown in the figures. It is also understood that terms such as "top," "bottom," "outward," "inward," and the like are words of convenience and are not to be construed as limiting terms.

Referring to the drawings in general and to FIG. 1 in particular, it will be understood that the illustrations are for the purpose of describing a preferred embodiment of the invention and are not intended to limit the invention thereto.

An article 10, such as an airfoil, that is adapted for exposure to high-temperature conditions, typically greater than about 1000° C., includes a first piece 12 and a second piece 14, as shown in FIG. 1. In an exemplary embodiment, article 10 is an airfoil, for example a double-walled airfoil, for use within a hot gas path of a turbine assembly. Article 10 may be a component, such as a diffuser, casing, seal ring structure, or the like that is intended for use in a turbine assembly or any other structure in which temperatures in excess of about 1000° C. are encountered. Article 10 has a melting temperature of at least about 1500° C., and, preferably, at least about 1700° C.

First piece 12 is made of a first niobium silicide-based refractory intermetallic composite (hereinafter referred to as "Nb-based RMIC") or a first molybdenum silicide based intermetallic composite (hereinafter referred to as "Mo-based RMIC"). The first Nb-based RMIC typically comprises titanium, hafnium, silicon, chromium, and niobium and first Mo-based RMIC typically comprises molybdenum, silicon, and at least one of chromium and boron.

Second piece 14 is joined by a braze 16 to first piece 12. Second piece 14 is made of a second Nb-based RMIC or a second Mo-based RMIC. The second Nb-based RMIC typically comprises titanium, hafnium, silicon, chromium, and niobium, and the second Mo-based RMIC typically comprises molybdenum, silicon, and at least one of chromium and boron.

The Nb-based RMICs that are used to form the article 10 of the present invention possess a good balance of oxidation resistance and mechanical properties. The Nb-based RMICs preferably have compositions in the range of: between about 20 and about 30 atomic percent titanium; between about 13 and about 20 atomic percent silicon; between about 2 and about 10 atomic percent hafnium; between about 1 and about 12 atomic percent chromium; between about 1 and about 3 atomic percent aluminum; and between about 5 and about 7 atomic percent boron; with the balance comprising niobium. In order to provide even greater oxidation resistance, these alloys may optionally contain greater amounts of chromium and aluminum. In addition, the Nb-based RMICs may further include up to about 4 atomic percent Ge, and up to about 6 atomic percent each of Mo, Ta, V, W, Fe, Sn, and Zr.

In the present invention, the Mo-based RMICs that are used to form the article 10 are based on molybdenum suicides, such as, but not limited to, $MoSi_2$, $Mo_3Si$, $Mo_5Si_3$, and $Mo_5SiB_2$ and comprise molybdenum, silicon, and at least one of boron or chromium. The Mo-based RMICs each preferably comprise between about 2.5 and about 13.5 atomic percent silicon, between about 3.5 and about 26.5 atomic percent boron, and a balance of molybdenum. Alternatively, the Mo-based RMICs may comprise between about 13 and about 16 atomic percent silicon, between about 25 and about 40 atomic percent chromium, and a balance of molybdenum. The Mo-based RMICs may also include other elements, such as, but not limited to, tantalum, titanium, zirconium, rhenium, carbon, hafnium, germanium, tungsten, vanadium, tin, and aluminum.

The joints formed by braze 16 at interface 18 in article 10 must sustain thermal, axial/centrifugal, and pressure differential stresses. In an airfoil, for example, the gas path side of the article (formed by second piece 14 in FIG. 1) may experience temperatures of about 1315° C., whereas the cold side (formed by first piece 12 in FIG. 1) may only reach about 1000° C. Both steady-state and transient (occurring during aircraft takeoffs and landings) thermal stresses act upon the bonding surfaces in a shear mode. The pressure differential between the gas path side and the cold side can be as high as about 0.1 ksi, and it will exert ballooning, or tensile, stresses on the bonding surfaces at interface 18. In addition, the airfoils also produce centrifugal stresses during rotation that act upon the bonding surface in a shear mode. The combined stresses acting on the bonding surfaces can be very significant at the potentially high operating temperatures of a turbine assembly. The joints formed by braze 16 at interface 18 must be able to withstand such stresses.

The interaction between braze 16, first piece 12, and second piece 14 must also be considered. The braze 16 must not significantly degrade the properties of the Nb- and/or Mo-based RMICs that form first piece 12 and second piece 14; it is preferable that braze 16 consume as little of first piece 12 and/or second piece 14 as is practical. Moreover, braze 16 must have sufficient oxidation and environmental resistance to avoid internal oxidation during the brazing and subsequent homogenization processes.

Temperature regimes for the bonding operations also impose constraints on the selection of braze 16 for joining first piece 12 and second piece 14. Preferably, braze 16 can be used for joining first piece 12 and second piece 14 at temperatures below about 1450° C., as bonding of first piece 12 and second piece 14 at temperatures higher than about 1450° C. requires expensive tooling and fixtures that may not be able to produce an article 10 that has the required precision in dimensions. In addition, internal oxidation becomes a severe threat to forming good bonds at higher temperatures. On the other hand, when the braze 16 has a melting temperature below the potential operating temperatures (e.g., about 1000° C.) of article 10, care must be taken to ensure that low eutectic compositions of braze 16 with either first piece 12 or second piece 14 do not exist after homogenization of the interface.

Interdiffusion of elements from the braze 16 into first piece 12 and second piece 14 enhances joining of first piece 12 and second piece 14 by braze 16. Thus, the solubility of the elements of braze 16 in the Nb-based and/or Mo-based RIMCs must also be taken into account. After brazing and homogenization, the bonded and diffused regions of article 10 preferably have melting temperatures of up to about 1450° C. In service, joints formed by braze 16 at interface 18 in article 10 are exposed to temperatures that are close to the bulk temperature of article 10, or up to about 1200° C., rather than the temperature of up to about 1315° C. that is experienced by the surface (formed by second piece 14 in FIG. 1) of article 10. The approximate temperature regimes of the brazing and homogenization operations relative to the melting temperatures and the potential working temperatures of Nb- and Mo-based RIMCs are summarized in FIG. 2.

A number of braze systems are primarily based on eutectic or congruent melting systems; the composition of such brazes are therefore restricted by available eutectic compositions and temperatures. Some such eutectic or eutectic-like compositions may not have enough strength, ductility, and/or oxidation-resistance to serve as successful brazes for Nb- and Mo-based RMICs.

The present invention employs a braze 16 comprising a physical mixture of at least two components having different melting temperatures. At the brazing temperature, one component melts while the remaining component(s) remains solid, thus creating a semi-solid braze. The solid component of such a semi-solid braze may comprise a component that will provide strength and toughness to the bonded area. At the brazing temperature, the liquid phase can vary from about 20 to about 80 volume percent, and, preferably, between about 30 and about 50 volume percent of braze 16. By way of example, the liquid component of braze 16 may be based on the Ti—Si eutectic at about 13.5 atomic percent Si, having a melting temperature of about 1330° C. The solid component may be, but is not limited to, a niobium-silicon composition containing 18.7 atomic percent silicon (i.e., Nb-18.7 at. % Si); or a niobium-hafnium-silicon composition containing 16 atomic percent hafnium and 18.7 atomic percent silicon (i.e., Nb-16 at. % Hf-24 at. % Si); or the like. Such a semi-solid braze would allow brazing to take place at about 1400° C. In another example, a semi-solid braze comprising about 10 volume percent of a V—Zr eutectic composition, containing about 57 atomic percent Zr and having a melting temperature of about 1265° C., 20 volume percent of a Cr—Ti eutectic composition, containing about 55 atomic percent Ti and having a melting temperature of about 1410° C., and 70 volume percent of a Hf—W—Nb alloy may be used to achieve an improved balance of oxidation resistance and mechanical properties.

In addition to achieving the desired balance between oxidation resistance and mechanical properties and allowing the use of braze compositions that deviate from the eutectic compositions, the semi-solid brazes of the present invention also overcome the solubility limitations of conventional braze compositions and the time required for diffusion bonding. A considerable amount of time is usually required for a molten braze to diffuse into the first and second pieces 12, 14 formed from Nb- and/or Mo-based RMICs. In addition, in order for first and second pieces 12, 14 to accommodate the components of the molten braze, a significant amount of the Nb- and/or Mo-based RMICs is consumed, and the braze region near interface 18 will mostly comprise a metal phase and thus possess limited strength, but good toughness, after diffusion bonding. By using a semi-solid braze of the present invention, the brazing operation can be performed in significantly less time and at a lower temperature than with a conventional eutectic braze composition. Moreover, the diffusion bonded region formed using the semi-solid braze of the present invention will have properties that more closely approach those of the parent Nb- and/or Mo-based RMIC first and second pieces 12, 14 that are being joined.

In one embodiment, braze 16 is a semi-solid braze comprising a first component and a second component. The first component is an alloy comprising a first metallic element and a second metallic element. The first element is one of titanium, palladium, zirconium, niobium, germanium, silicon, and hafnium. Second metallic element is one of titanium, palladium, zirconium, niobium, hafnium, aluminum, chromium, vanadium, platinum, gold, iron, nickel, and cobalt, wherein the first element and second metallic element are not the same element. Compositions of the first component of braze 16 are summarized in Table 1. The second component of braze 16 has a melting temperature greater than 1450° C. and comprises at least one of niobium, molybdenum, titanium, hafnium, silicon, boron, aluminum, tantalum, germanium, vanadium, tungsten, zirconium, and chromium.

In a first embodiment, the first component of braze 16 comprises between about 30 and about 90 atomic percent titanium with the balance comprising a metal selected from the group consisting of palladium, platinum, gold, chromium, cobalt, nickel, and iron. The first component of braze 16 may further include at least one additional element selected from the group consisting of silicon, germanium, hafnium, niobium, palladium, platinum, gold, aluminum, chromium, boron, zirconium, iron, cobalt, nickel, and vanadium, wherein the at least one additional element comprises up to about 20 atomic percent of the first component of braze 16. The at least one additional element is different from the first element and second metallic element. In one preferred embodiment, first component of braze 16 comprises between about 90 and about 55 atomic percent and, more preferably, between about 63 and about 73 atomic percent titanium with the balance comprising palladium. In another preferred embodiment, first component of braze 16 comprises between about 80 and about 30 atomic percent, and, more preferably, between about 50 and about 60 atomic percent titanium with the balance comprising chromium. In another preferred embodiment, first component of braze 16 comprises between about 94 and about 74 atomic percent and, more preferably, between about 82 and about 86 atomic percent titanium with the balance comprising platinum. In another preferred embodiment, first component of braze 16 comprises between 100 and about 59 atomic percent and, more preferably, between about 74 and about 84 atomic percent titanium with the balance comprising gold. In another preferred embodiment, first component of braze 16 comprises between about 58 and about 90 atomic percent and, more preferably, between about 68 and about 78 atomic percent titanium with the balance comprising cobalt. In another preferred embodiment, first component of braze 16 comprises between about 90 and about 50 atomic percent and, more preferably, between about 70 and about 80 atomic percent titanium with the balance comprising iron. In another preferred embodiment, first component of braze 16 comprises between about 50 and about 90 atomic percent and, more preferably, between about 71 and about 81 atomic percent titanium with the balance comprising nickel.

In a second embodiment, the first component of braze 16 comprises between about 20 and about 85 atomic percent palladium with the balance comprising one of chromium, aluminum, hafnium, zirconium, niobium, and vanadium. The first component of braze 16 may further include at least one additional element selected from the group consisting of silicon, germanium, hafnium, niobium, platinum, gold, aluminum, chromium, boron, zirconium, titanium, iron, nickel, cobalt, and vanadium, wherein the at least one additional element comprises up to about 20 atomic percent of the first component of braze 16. The at least one additional element is different from the first element and second metallic element. In a preferred embodiment, first component of braze 16 comprises between about 20 and about 80 atomic percent and, more preferably, between about 39 and about 49 atomic percent palladium with the palladium with the balance comprising chromium. In another preferred embodiment, first component of braze 16 comprises between about 70 and about 86 atomic percent and, more preferably, between about 75 and about 81 atomic percent palladium with the balance comprising aluminum. In another preferred embodiment, first component of braze 16 comprises between about 22 and about 32 atomic percent and, more preferably, between about 25 and about 29 atomic percent palladium with the balance comprising hafnium. In another preferred embodiment, first component of braze 16 comprises between about 10 and about 35 atomic percent and, more preferably, between about 22 and about 28 atomic percent palladium with the balance comprising zirconium. In another preferred embodiment, first component of braze 16 comprises between about 35 and about 60 atomic percent and, more preferably, between about 45 and about 49 atomic percent palladium with the balance comprising niobium. In another preferred embodiment, first component of braze 16 comprises between about 20 and about 60 atomic percent and, more preferably, between about 36 and about 44 atomic percent palladium with the balance comprising vanadium.

In a third embodiment, the first component of braze 16 comprises between about 45 and about 90 atomic percent zirconium with the balance comprising one of platinum and vanadium. The first component of braze 16 may further include at least one additional element selected from the group consisting of silicon, germanium, hafnium, niobium, platinum, palladium, gold, aluminum, chromium, boron, titanium, iron, nickel, cobalt, and vanadium, wherein the at least one additional element comprises up to about 20 atomic percent of the first component of braze 16. The at least one additional element is different from the first element and second metallic element. In a preferred embodiment, first component of braze 16 comprises between about 68 and about 90 atomic percent and, more preferably, between about 77 and about 81 atomic percent zirconium with the balance comprising platinum. In another preferred embodiment, first component of braze 16 comprises between about 45 and about 65 atomic percent and, more preferably, between about 55 and about 59 atomic percent zirconium with the balance comprising vanadium.

In a fourth embodiment, the first component of braze 16 comprises between about 15 and about 80 atomic percent niobium with the balance comprising one of iron, nickel, and cobalt. The first component of braze 16 may further include at least one additional element selected from the group consisting of silicon, germanium, hafnium, palladium, platinum, gold, aluminum, chromium, boron, titanium, iron, nickel, cobalt, and vanadium, wherein the at least one additional element comprises up to about 20 atomic percent of the first component of braze 16. The at least one additional element is different from the first element and second metallic element. In a preferred embodiment, first component of braze 16 comprises between about 50 and about 80 atomic percent and, more preferably, between about 62 and about 66 atomic percent niobium with the balance comprising iron. In another preferred embodiment, first component of braze 16 comprises between about 15 and about 50 atomic percent and, more preferably, between about 35 and about 45 atomic percent niobium with the balance comprising nickel. In another preferred embodiment, first component of braze 16 comprises between about 50 and about 71 atomic percent and, more preferably, between about 59 and about 63 atomic percent niobium with the balance comprising cobalt.

In a fifth embodiment, the first component of braze 16 comprises between about 54 and about 74 atomic percent and, more preferably, comprises between about 62 and about 64 atomic percent hafnium with the balance comprising iron. The first component of braze 16 may further include at least one additional element selected from the group consisting of palladium, gold, niobium, aluminum, chromium, boron, cobalt, nickel, and vanadium, wherein the at least one additional element comprises up to about 20 atomic percent of the first component of braze 16. The at least one additional element is different from the first element and second metallic element.

In a sixth embodiment, the first component of braze 16 comprises a first element, which is one of germanium and silicon, and a metallic element selected from the group consisting of chromium, titanium, gold, aluminum, palladium, platinum, and nickel, and, in one embodiment, has a melting temperature of between about 360° C. and 1430° C. The first component of braze 16 may further include at least one additional element selected from the group consisting of platinum, palladium, gold, silicon, germanium, titanium, niobium, hafnium, aluminum, iron, cobalt, zirconium, vanadium, chromium, and boron, wherein the at least one additional element comprises up to about 20 atomic percent of the first component of braze 16. The at least one additional element is different from the first element and the metallic element.

In a first preferred embodiment of a germanium-based first component, first component of braze 16 comprises between about 50 and 100 atomic percent germanium with the balance comprising chromium. More preferably, braze 16 comprises between about 80 and about 90 atomic percent germanium with the balance comprising chromium.

In a second preferred embodiment of a germanium-based first component, first component of braze 16 comprises between about 75 and 100 atomic percent germanium with the balance comprising titanium. Alternatively, first component of braze 16 may comprise between about 10 and about 25 atomic percent germanium with the balance comprising titanium. In a more preferred embodiment, first component of braze 16 comprises between about 86 and about 90 atomic percent germanium with the balance comprising titanium. In another more preferred embodiment, first component of braze 16 comprises between about 13 and about 17 atomic percent germanium with the balance comprising titanium.

In a third preferred embodiment of a germanium-based first component, first component of braze 16 comprises up to 100 atomic percent germanium with the balance comprising gold. More preferably, first component of braze 16 comprises between about 23 and about 33 atomic percent germanium with the balance comprising gold.

In a fourth preferred embodiment of a germanium-based first component, first component of braze 16 comprises up to 100 atomic percent germanium with the balance comprising aluminum. More preferably, first component of braze 16 comprises between about 33 and about 43 atomic percent germanium with the balance comprising aluminum.

In a fifth preferred embodiment of a germanium-based first component, first component of braze 16 comprises between about 10 and 100 atomic percent germanium with the balance comprising palladium. More preferably, first component of braze 16 comprises between about 14 and about 24 atomic percent germanium with the balance comprising palladium.

In a sixth preferred embodiment of a germanium-based first component, first component of braze 16 comprises between about 20 and 100 atomic percent germanium with the balance comprising platinum. In a more preferred embodiment, first component of braze 16 comprises between about 35 and about 41 atomic percent germanium with the balance comprising platinum. In another more preferred embodiment, first component of braze 16 comprises between about 74 and about 80 atomic percent germanium with the balance comprising platinum.

In a seventh preferred embodiment of a germanium-based first component, first component of braze 16 comprises between about 60 and 100 atomic percent germanium with the balance comprising nickel. More preferably, first component of braze 16 comprises between about 62 and about 70 atomic percent germanium with the balance comprising nickel.

In a first preferred embodiment of a silicon-based first component, first component of braze 16 comprises between about 70 and about 90 atomic percent silicon with the balance comprising chromium. More preferably, first component of braze 16 comprises between about 80 and about 84 atomic percent silicon with the balance comprising chromium.

In a second preferred embodiment of a silicon-based first component, first component of braze 16 comprises between about 10 and about 20 atomic percent silicon with the balance comprising titanium. More preferably, first component of braze 16 comprises between about 10 and about 16 atomic percent silicon with the balance comprising titanium.

In a third preferred embodiment, first component of braze 16 comprises between about 75 and 100 atomic percent silicon with the balance comprising titanium. More preferably, first component of braze 16 comprises between about 81 and about 85 atomic percent silicon with the balance comprising titanium.

In a fourth preferred embodiment of a silicon-based first component, first component of braze 16 comprises up to about 50 atomic percent silicon with the balance comprising gold. More preferably, first component of braze 16 comprises between about 16 and about 22 atomic percent silicon with the balance comprising gold.

In a fifth preferred embodiment of a silicon-based first component, first component of braze 16 comprises up to about 70 atomic percent silicon with the balance comprising aluminum. More preferably, first component of braze 16 comprises between about 9 and about 15 atomic percent silicon with the balance comprising aluminum.

In a sixth preferred embodiment of a silicon-based first component, first component of braze 16 comprises between about 95 and about 10 atomic percent silicon with the balance comprising palladium. In a more preferred embodiment, first component of braze 16 comprises between about 48 and about 56 atomic percent silicon with the balance comprising palladium. In another more preferred embodiment, first component of braze 16 comprises between about 14 and about 22 atomic percent silicon with the balance comprising palladium.

In a seventh preferred embodiment of a silicon-based first component, first component of braze 16 comprises between about 20 and 100 atomic percent silicon with the balance comprising platinum. In a more preferred embodiment, first component of braze 16 comprises between about 24 and about 30 atomic percent silicon with the balance comprising platinum. In another more preferred embodiment, first component of braze 16 comprises between about 64 and about 70 atomic percent silicon with the balance comprising platinum.

In an eighth preferred embodiment of a silicon-based first component, first component of braze 16 comprises between about 5 and about 70 atomic percent silicon with the balance comprising nickel. More preferably, first component of braze 16 comprises between about 45 and about 55 atomic percent silicon with the balance comprising nickel.

TABLE 1

List of materials for first component of braze for joining Nb- and Mo-based RMICs based on binary metallic systems.

| Preferred braze composition range, at. % | More preferred composition range, at. % | Further additions, total amount up to 20 at. % |
|---|---|---|
| Ti: 90–55 | Ti: 67.5 ± 5 | Ge, Si, Hf, Nb, Pt, Au, Al, Cr, B, Fe, Co, Ni |
| Pd: 10–45 | Pd: 32.5 ± 5 | |
| Cr: 80–20 | Cr: 56 ± 5 | Ge, Si, Al, Ti, Pt, Nb, Zr, V, Hf, Au, B, Fe, |
| Pd: 20–80 | Pd: 44 ± 5 | Co, Ni |
| V: 55–45 | V: 43 ± 2 | Ge, Si, Al, Ti, Nb, Cr, Hf, Pt, Pd, Au, B, Fe, |
| Zr: 45–65 | Zr: 57 ± 2 | Co, Ni |
| Pd: 70–86 | Pd: 78 ± 3 | Ge, Si, Ti, Nb, Cr, Zr, V, Hf, Pt, Au, B, Fe, |
| Al: 30–14 | Al: 21 ± 3 | Co, Ni |
| Ti: 80–30 | Ti: 55 ± 5 | Ge, Si, Al, Nb, Zr, V, Hf, Pt, Pd, Au, B, Fe, |
| Cr: 20–70 | Cr: 45 ± 5 | Co, Ni |
| Ti: 74–94 | Ti: 84 ± 2 | Ge, Si, Al, Cr, Nb, V, Hf, Pd, Au, B, Fe, |
| Pt: 6–26 | Pt: 16 ± 2 | Co, Ni |
| Pd: 22–32 | Pd: 27 ± 2 | Ge, Si, Al, Ti, Cr, Nb, Zr, V, Pt, Au, B, Fe, |
| Hf: 78–68 | Hf: 73 ± 2 | Co, Ni |
| Pd: 10–35 | Pd: 25 ± 3 | Ge, Si, Al, Ti, Cr, Nb, V, Hf, Pt, Au, B, Fe, |
| Zr: 90–65 | Zr: 75 ± 3 | Co, Ni |
| Pt: 10–32 | Pd: 21 ± 2 | Ge, Si, Al, Ti, Cr, Nb, V, Hf, Pd, Au, B, Fe, |
| Zr: 90–68 | Zr: 79 ± 2 | Co, Ni |
| Nb: 65–40 | Nb: 53 ± 2 | Ge, Si, Al, Ti, Cr, V, Hf, Pt, Au, B, Fe, Co, |
| Pd: 35–60 | Pd: 47 ± 2 | Ni |
| Pd: 20–60 | Pd: 40 ± 4 | Ge, Si, Al, Ti, Cr, Nb, Zr, Hf, Pt, Au, B, Fe, |
| V: 80–40 | V: 60 ± 4 | Co, Ni |
| Ti: 90–55 | Ti: 79 ± 5 | Ge, Si, Al, Nb, Cr, V, Hf, Pt, Pd, B, Fe, Co, |
| Au: 10–45 | Au: 21 ± 5 | Ni |
| Ti: 58–90 | Ti: 73 ± 5 | Ge, Si, Al, Nb, Cr, V, Hf, Pt, Pd, Au, B, Fe, |
| Co: 42–10 | Co: 27 ± 5 | Ni |
| Ti: 90–50 | Ti: 70 ± 5 | Ge, Si, Al, Nb, Cr, V, Hf, Pt, Pd, Au, B, Co, |
| Fe: 10–50 | Fe: 30 ± 5 | Ni |
| Ti: 90–50 | Ti: 76 ± 5 | Ge, Si, Al, Nb, Cr, V, Hf, Pt, Pd, Au, B, Fe, |
| Ni: 10–50 | Ni: 24 ± 5 | Co |
| Nb: 80–50 | Nb: 64 ± 2 | Ge, Si, Al, Ti, Cr, V, Hf, Pt, Pd, Au, B, Co, |
| Fe: 20–50 | Fe: 36 ± 2 | Ni |
| Nb: 15–50 | Nb: 40.5 ± 5 | Ge, Si, Al, Ti, Cr, V, Hf, Pd, Au, B, Fe, Co |
| Ni: 85–50 | Ni: 59.5 ± 5 | |
| Nb: 71–50 | Nb: 61 ± 2 | Ge, Si, Al, Ti, Cr, V, Hf, Pd, Au, B, Fe, Ni |
| Co: 29–50 | Co: 39 ± 2 | |
| Hf: 54–74 | Hf: 64 ± 2 | Al, Nb, Cr, V, Pd, Au, B, Co, Ni |
| Fe: 46–26 | Fe: 36 ± 2 | |
| Cr: 50–0 | Cr: 15 ± 2 | Si, Nb, Ti, Hf, Al, B |
| Ge: 50–100 | Ge: 85 ± 5 | |
| Ti: 25–0 | Ti: 12 ± 2 | Si, Nb, Cr, Hf, Al, B |
| Ge: 75–100 | Ge: 88 ± 2 | |
| Ti: 75–90 | Ti: 85 ± 2 | Si, Al, Nb, Cr, V, Zr, Hf, Pd, Pt, Au, B |
| Ge: 10–25 | Ge: 15 ± 2 | |
| Au: 0–100 | Au: 72 ± 5 | Si, Al, Ti, Nb, Cr, V, Zr, Hf, Pd, Pt, B |
| Ge: 100–0 | Ge: 28 ± 5 | |
| Al: 100–0 | Al: 72 ± 5 | Si, Ti, Nb, Cr, V, Zr, Hf, Pd, Pt, B |
| Ge: 0–100 | Ge: 28 ± 5 | |
| Pd: 0–90 | Pd: 81 ± 5 | Si, Al, Ti, Nb, Cr, V, Zr, Hf, Pt, B |
| Ge: 100–10 | Ge: 19 ± 5 | |
| | Pd: 36 ± 5 | |
| | Ge: 64 ± 5 | |
| Pt: 0–80 | Pt: 62 ± 3 | Si, Al, Ti, Nb, Cr, V, Zr, Hf, Pd, B |
| Ge: 100–20 | Ge: 38 ± 3 | |
| | Pt: 23 ± 3 | |
| | Ge: 77 ± 3 | |
| Ge: 100–60 | Ge: 66 ± 4 | Si, Ti, Cr, Fe, Co |
| Ni: 0–40 | Ni: 34 ± 4 | |
| Cr: 30–10 | Cr: 18 ± 2 | Ge, Nb, Ti, Hf, Al, B |
| Si: 70–90 | Si: 82 ± 2 | |
| Ti: 80–90 | Ti: 87 ± 3 | Ge, Al, Nb, Cr, V, Zr, Hf, Co, Fe, Ni, Pd, |
| Si: 10–20 | Si: 13 ± 3 | Pt, Au, B |
| Ti: 25–0 | Ti: 17 ± 2 | Ge, Al, Nb, Cr, V, Zr, Hf, Pd, Pt, Au, B |
| Si: 75–100 | Si: 83 ± 2 | |
| Au: 50–100 | Au: 81 ± 3 | Ge, Al, Ti, Nb, Cr, V, Zr, Hf, Pd, Pt, B |
| Si: 0–50 | Si: 19 ± 3 | |
| Al: 100–30 | Al: 88 ± 3 | Ge, Ti, Nb, Cr, V, Zr, Hf, Pd, Pt, B |
| Si: 0–70 | Si: 12 ± 3 | |
| Pd: 5–70 | Pd: 82 ± 4 | Ge, Al, Ti, Nb, Cr, V, Hf, Pt, B |
| Si: 95–10 | Si: 18 ± 4 | |
| | Pd: 48 ± 4 | |
| | Si: 52 ± 4 | |
| Pt: 0–80 | Pt: 73 ± 3 | Ge, Al, Ti, Nb, Cr, V, Zr, Hf, Pd, B |
| Si: 100–20 | Si: 27 ± 3 | |
| | Pt: 33 ± 3 | |
| | Si: 67 ± 3 | |
| Si: 5–70 | Si: 50 ± 5 | Ge, Al, Ti, Cr, Nb, Hf, Fe, Co |
| Ni: 95–30 | Ni: 50 ± 5 | |

Figure 2:
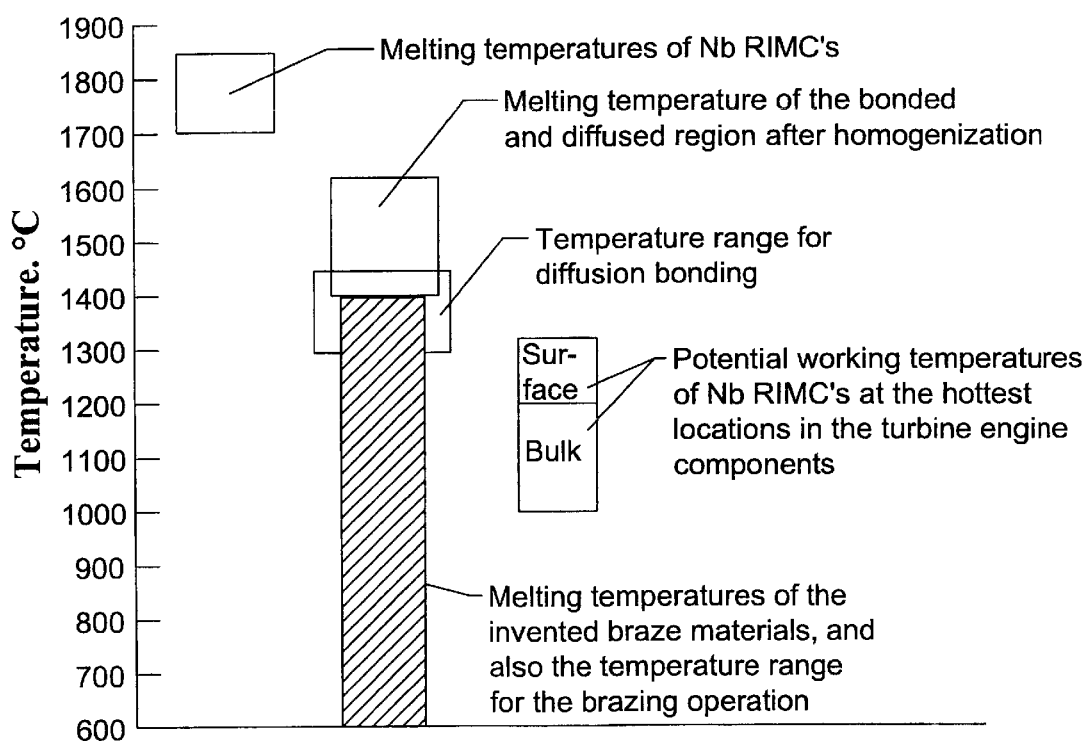
FIG. 2 is a plot of approximate temperature regimes of the brazing and homogenization operations relative to the melting temperatures and the potential working temperatures of Nb- and Mo-based RIMCs.
Figure 3:
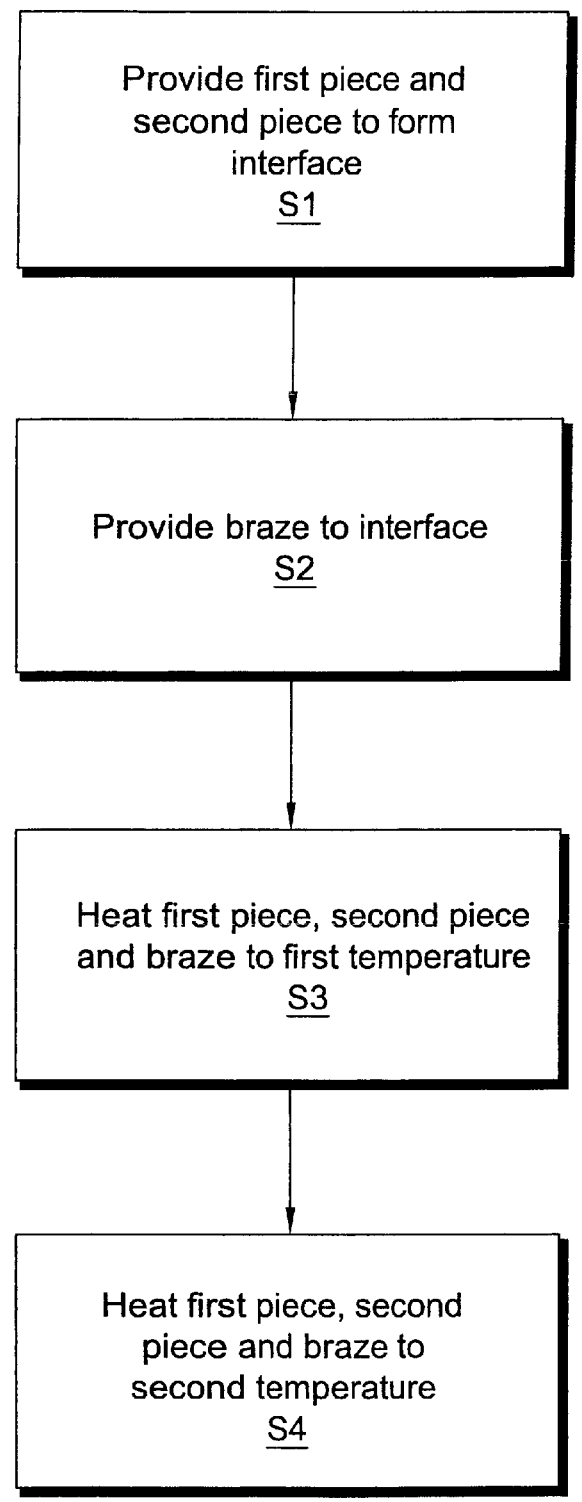
FIG. 3 is a method flow chart in accordance with one embodiment of the present invention.

A method of making article 10 is shown in FIG. 2. First, in step S1, first piece 12 and second piece 14 are provided such that first piece 12 and second piece 14 form an interface 18 therebetween. Next, in step S2, braze 16, which is a semi-solid braze as described above, is provided to interface 18 between first piece 12 and second piece 14. Braze 16 may be provided to interface 18 as a foil, which is sandwiched between first piece 12 and second piece 14. In those instances where braze 16 is too brittle to be formed into a foil, either a powder tape or powder paste of braze 16 may be used to provide the braze 16 to the interface 18.

Next, at step S3, first piece 12, second piece 14, and braze 16 are heated to a first temperature for a first predetermined hold time, the first temperature being at least 20° C. above the melting temperature of the first component of braze 16. Next, at step S4, first piece 12, second piece 14, and braze 16 are further heated to a temperature up to about 1450° C. for a second predetermined hold time, thereby joining first piece 12 and second piece 14 at interface 18 and forming article 10.

While typical embodiments have been set forth for the purpose of illustration, the foregoing description should not be deemed to be a limitation on the scope of the invention. Accordingly, various modifications, adaptations, and alternatives may occur to one skilled in the art without departing from the spirit and scope of the present invention.

What is claimed is:

1. An article having a melting temperature of at least about 1500° C., said article comprising:

a) a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron; and b) a second piece joined by a braze to said first piece, said second piece comprising one of a second niobium-based refractory metal intermetallic composite and a second molybdenum-based refractory metal intermetallic composite, wherein said second niobium-based refractory metal intermetallic composite comprises titanium, hafnium, silicon, chromium, and niobium, and said second molybdenum-based refractory metal intermetallic composite comprises molybdenum, silicon, and at least one of chromium and boron, and wherein said braze is a semi-solid braze that comprises a first component and a second component, said first component comprising a first element and a second metallic element, wherein said first element is one of titanium, palladium, zirconium, niobium, germanium, silicon, and hafnium, wherein said second metallic element is one of titanium, palladium, zirconium, niobium, hafnium, aluminum, chromium, vanadium, platinum, gold, iron, nickel, and cobalt, said second metallic element being different from said first element, and wherein said second component has a melting temperature of greater than 1450° C. and comprises at least one of niobium, molybdenum, titanium, hafnium, silicon, boron, aluminum, tantalum, germanium, vanadium, tungsten, zirconium, and chromium.

2. The article according to claim 1, wherein said first component of said braze comprises between about 30 and about 90 atomic percent titanium with the balance comprising one of palladium, platinum, gold, chromium, cobalt, nickel, and iron.

3. The article according to claim 2, wherein said first component of said braze further comprises at least one additional element selected from the group consisting of silicon, germanium, hafnium, niobium, palladium, platinum, gold, aluminum, chromium, boron, zirconium, iron, cobalt, nickel, and vanadium, and wherein said at least one additional element comprises up to about 20 atomic percent of said first component.

4. The article according to claim 1, wherein said first component of said braze comprises between about 20 and about 85 atomic percent palladium with the balance comprising one of chromium, aluminum, hafnium, zirconium, niobium, and vanadium.

5. The article according to claim 4, wherein said first component of said braze comprises at least one additional element selected from the group consisting of silicon, germanium, hafnium, niobium, platinum, gold, aluminum, chromium, boron, zirconium, titanium, iron, nickel, cobalt, and vanadium, and wherein said at least one additional element comprises up to about 20 atomic percent of said first component.

6. The article according to claim 1, wherein said first component of said braze comprises between about 45 and about 90 atomic percent zirconium with the balance comprising one of platinum and vanadium.

7. The article according to claim 6, wherein said first component of said braze further comprises at least one additional element selected from the group consisting of silicon, germanium, hafnium, niobium, platinum, palladium, gold, aluminum, chromium, boron, titanium, iron, nickel, cobalt, and vanadium, and wherein said at least one additional element comprises up to about 20 atomic percent of said first component.

8. The article according to claim 1, wherein said first component of said braze comprises between about 15 and about 80 atomic percent niobium with the balance comprising a metal selected from the group consisting of iron, nickel, and cobalt.

9. The article according to claim 8, wherein said first component of said braze further comprises at least one additional element selected from the group consisting of silicon, germanium, hafnium, palladium, platinum, gold, aluminum, chromium, boron, titanium, iron, nickel, cobalt, and vanadium, and wherein said at least one additional element comprises up to about 20 atomic percent of said first component.

10. The article according to claim 1, wherein said first component of said braze comprises between about 54 and about 74 atomic percent hafnium with the balance comprising iron.

11. The article according to claim 10, wherein said first component of said braze further comprises at least one additional element selected from the group consisting of palladium, gold, niobium, aluminum, chromium, boron, cobalt, nickel, and vanadium, and wherein said at least one additional element comprises up to about 20 atomic percent of said first component.

12. The article according to claim 1, wherein said first component of said braze comprises one of germanium and silicon, and one of chromium, titanium, gold, aluminum, palladium, platinum, and nickel.

13. The article according to claim 12, wherein said first component of said braze has a melting temperature between about 360° C. and 1430° C.

14. The article according to claim 12, wherein said first component further comprises at least one additional element selected from the group consisting of platinum, palladium, gold, silicon, germanium, titanium, niobium, hafnium, aluminum, iron, cobalt, zirconium, vanadium, chromium, and boron, and wherein said at least one additional element comprises up to about 20 atomic percent of said first component.

15. The article according to claim 1, wherein said melting temperature is at least about 1700° C.

16. The article according to claim 1, wherein said first piece comprises said first niobium-based refractory metal intermetallic composite.

17. The article according to claim 16, wherein said second piece comprises said second niobium-based refractory metal intermetallic composite.

18. The article according to claim 1, wherein said first piece comprises said first molybdenum-based refractory metal intermetallic composite.

19. The article according to claim 18, wherein said second piece comprises said second molybdenum-based refractory metal intermetallic composite.

20. The article according to claim 1, wherein said article is one of an airfoil, a diffuser, a casing, and a seal ring structure.

21. The article according to claim 20, wherein said article has a service temperature of at least about 1000° C.

22. An airfoil having a melting temperature of at least about 1500° C. and a service temperature of at least about 1000° C., said airfoil comprising:

a) a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron; and b) a second piece joined by a braze to said first piece, said second piece comprising one of a second niobium-based refractory metal intermetallic composite and a second molybdenum-based refractory metal intermetallic composite, wherein said second niobium-based refractory metal intermetallic composite comprises titanium, hafnium, silicon, chromium, and niobium, and said second molybdenum-based refractory metal intermetallic composite comprises molybdenum, silicon, and at least one of chromium and boron.

23. The airfoil according to claim 22, wherein said airfoil is a double-walled airfoil.

24. The airfoil according to claim 23, wherein said airfoil is located in a hot gas path of a turbine assembly.

25. The airfoil according to claim 22, wherein said melting temperature is at least about 1700° C.

26. The airfoil according to claim 22, wherein said first piece comprises said first niobium-based refractory metal intermetallic composite.

27. The airfoil according to claim 26, wherein said second piece comprises said second niobium-based refractory metal intermetallic composite.

28. The airfoil according to claim 22, wherein said first piece comprises said first molybdenum-based refractory metal intermetallic composite.

29. The airfoil according to claim 28, wherein said second piece comprises said second molybdenum-based refractory metal intermetallic composite.

30. An airfoil having a melting temperature of at least about 1500° C., said airfoil comprising:
   a) a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron; and
   b) a second piece joined by a braze to said first piece, said second piece comprising one of a second niobium-based refractory metal intermetallic composite and a second molybdenum-based refractory metal intermetallic composite, wherein said second niobium-based refractory metal intermetallic composite comprises titanium, hafnium, silicon, chromium, and niobium, and said second molybdenum-based refractory metal intermetallic composite comprises molybdenum, silicon, and at least one of chromium and boron, and wherein said braze is a semi-solid braze that comprises a first component and a second component, said first component comprising a first element and a second metallic element, wherein said first element is one of titanium, palladium, zirconium, niobium, germanium, silicon, and hafnium, wherein said second metallic element is one of titanium, palladium, zirconium, niobium, hafnium, aluminum, chromium, vanadium, platinum, gold, iron, nickel, and cobalt, said second metallic element being different from said first element, and wherein said second component has a melting temperature greater than 1450° C. and comprises at least one of niobium, molybdenum, titanium, hafnium, silicon, boron, aluminum, tantalum, germanium, vanadium, tungsten, zirconium, and chromium.

31. The airfoil according to claim 30, wherein said first component of said braze comprises between about 30 and about 90 atomic percent titanium with the balance comprising one of palladium, platinum, gold, chromium, cobalt, nickel, and iron.

32. The airfoil according to claim 31, wherein said first component of said braze further comprises at least one additional element selected from the group consisting of silicon, germanium, hafnium, niobium, palladium, platinum, gold, aluminum, chromium, boron, zirconium, iron, cobalt, nickel, and vanadium, and wherein said at least one additional element comprises up to about 20 atomic percent of said first component.

33. The airfoil according to claim 30, wherein said first component of said braze comprises between about 20 and about 85 atomic percent palladium with the balance comprising one of chromium, aluminum, hafnium, zirconium, niobium, and vanadium.

34. The airfoil according to claim 33, wherein said first component of said braze comprises at least one additional element selected from the group consisting of silicon, germanium, hafnium, niobium, platinum, gold, aluminum, chromium, boron, zirconium, titanium, iron, nickel, cobalt, and vanadium, and wherein said at least one additional element comprises up to about 20 atomic percent of said first component.

35. The airfoil according to claim 30, wherein said first component of said braze comprises between about 45 and about 90 atomic percent zirconium with the balance comprising one of platinum and vanadium.

36. The airfoil according to claim 35, wherein said first component of said braze further comprises at least one additional element selected from the group consisting of silicon, germanium, hafnium, niobium, platinum, palladium, gold, aluminum, chromium, boron, titanium, iron, nickel, cobalt, and vanadium, and wherein said at least one additional element comprises up to about 20 atomic percent of said first component.

37. The airfoil according to claim 30, wherein said first component of said braze comprises between about 15 and about 80 atomic percent niobium with the balance comprising a metal selected from the group consisting of iron, nickel, and cobalt.

38. The airfoil according to claim 37, wherein said first component of said braze further comprises at least one additional element selected from the group consisting of silicon, germanium, hafnium, palladium, platinum, gold, aluminum, chromium, boron, titanium, iron, nickel, cobalt, and vanadium, and wherein said at least one additional element comprises up to about 20 atomic percent of said first component.

39. The airfoil according to claim 30, wherein said first component of said braze comprises between about 54 and about 74 atomic percent hafnium with the balance comprising iron.

40. The airfoil according to claim 39, wherein said first component of said braze further comprises at least one additional element selected from the group consisting of palladium, gold, niobium, aluminum, chromium, boron, cobalt, nickel, and vanadium, and wherein said at least one additional element comprises up to about 20 atomic percent of said first component.

41. The airfoil according to claim 30, wherein said first component of said braze comprises one of germanium and silicon, and one of chromium, titanium, gold, aluminum, palladium, platinum, and nickel.

42. The airfoil according to claim 41, wherein said first component of said braze has a melting temperature between about 360° C. and 1430° C.

43. The airfoil according to claim 41, wherein said first component further comprises at least one additional element selected from the group consisting of platinum, palladium, gold, silicon, germanium, titanium, niobium, hafnium, aluminum, iron, cobalt, zirconium, vanadium, chromium, and boron, and wherein said at least one additional element comprises up to about 20 atomic percent of said first component.

44. The airfoil according to claim 30, wherein said airfoil is a double-walled airfoil.

45. The airfoil according to claim 30, wherein said airfoil is located in a hot gas path of a turbine assembly.

46. The airfoil according to claim 30, wherein said melting temperature is at least about 1700° C.

47. The airfoil according to claim 30, wherein said first piece comprises said first niobium-based refractory metal intermetallic composite.

48. The airfoil according to claim 47, wherein said second piece comprises said second niobium-based refractory metal intermetallic composite.

49. The airfoil according to claim 30, wherein said first piece comprises said first molybdenum-based refractory metal intermetallic composite.

50. The airfoil according to claim 49, wherein said second piece comprises said second molybdenum-based refractory metal intermetallic composite.

51. The airfoil according to claim 30, wherein said airfoil has a service temperature of at least about 1000° C.

52. A turbine assembly having at least one component, said at least one component having a melting temperature of at least about 1500° C. and comprising:
   a) a first piece comprising one of a first niobium-based refractory metal intermetallic composite and a first molybdenum-based refractory metal intermetallic composite, wherein said first niobium-based refractory metal intermetallic composite comprises titanium, hafnium, silicon, chromium, and niobium, and said first molybdenum-based refractory metal intermetallic composite comprises molybdenum, silicon, and at least one of chromium and boron; and
   b) a second piece joined by a braze to said first piece, said second piece comprising one of a second niobium-based refractory metal intermetallic composite and a second molybdenum-based refractory metal intermetallic composite, wherein said second niobium-based refractory metal intermetallic composite comprises titanium, hafnium, silicon, chromium, and niobium, and said second molybdenum-based refractory metal intermetallic composite comprises molybdenum, silicon, and at least one of chromium and boron, and wherein said braze is a semi-solid braze that comprises a first component and a second component, said first component comprising a first element and a second metallic element, wherein said first element is one of titanium, palladium, zirconium, niobium, germanium, silicon, and hafnium, wherein said second metallic element is one of titanium, palladium, zirconium, niobium, hafnium, aluminum, chromium, vanadium, platinum, gold, iron, nickel, and cobalt, said second metallic element being different from said first element, and wherein said second component has a melting temperature of at least about 1450° C. and comprises at least one of niobium, molybdenum, titanium, hafnium, silicon, boron, aluminum, tantalum, germanium, vanadium, tungsten, zirconium, and chromium.

53. The turbine assembly according to claim 52, wherein said at least one component is one of an airfoil, a diffuser, a casing, and a seal ring structure.

54. The turbine assembly to claim 52, wherein said at least one component has a service temperature of at least about 1000° C.

55. A method of making an article, the article having a melting temperature of at least about 1500° C. and comprising a first piece and a second piece that are joined together by a braze, wherein the first piece and second piece each comprise one of a niobium-based refractory metal intermetallic composite and a molybdenum-based refractory metal intermetallic composite, wherein the niobium-based refractory metal intermetallic composite comprises titanium, hafnium, silicon, chromium, and niobium and the molybdenum-based refractory metal intermetallic composite comprises molybdenum, silicon, and at least one of chromium and boron, the method comprising the steps of:
   a) providing the first piece and the second piece such that the first piece and the second piece form an interface therebetween;
   b) providing a braze to the interface between the first piece and the second piece, the braze being a semi-solid braze that comprises a first component and a second component, the first component having a first component melting temperature comprising a first element and a second metallic element, the first element being one of titanium, palladium zirconium, niobium, and hafnium, and the second metallic element being one of titanium, palladium, zirconium, niobium, hafnium, aluminum, chromium, vanadium, platinum, gold, iron, nickel, and colbalt, the first element being different from the second metallic element, and the second component having a second component melting temperature of at least about 1450° C. and comprising at least one of niobium, molybdenum, titanium, hafnium, silicon, boron, aluminum, tantalum, germanium, vanadium, tungsten, zirconium, and chromium;
   c) heating the first piece, the second piece, and the braze to a first temperature for a first predetermined hold time, the first temperature being at least about 20° C. above the first component melting temperature and less than the second component melting temperature; and
   d) further heating the first piece, the second piece, and the braze to a temperature up to about 1450° C. for a second predetermined hold time, thereby joining the first piece and the second piece at the interface and forming the article.

56. The method of claim 55, wherein the step of providing a braze to the interface between the first piece and the second piece comprises providing a braze in which the first component comprises between about 30 and about 90 atomic percent titanium with the balance comprising one of palladium, platinum, gold, chromium, cobalt, nickel, and iron.

57. The method of claim 56, wherein the first component of the braze further comprises at least one additional element selected from the group consisting of silicon, germanium, hafnium, niobium, palladium, platinum, gold, aluminum, chromium, boron, zirconium, iron, cobalt, nickel, and vanadium, and wherein the at least one additional element comprises up to about 20 atomic percent of the first component.

58. The method of claim 55, wherein the step of providing a braze to the interface between the first piece and the second piece comprises providing a braze in which the first component comprises between about 20 and about 85 atomic percent palladium with the balance comprising one of chromium, aluminum, hafnium, zirconium, niobium, and vanadium.

59. The method of claim 58, wherein the first component of the braze further comprises at least one additional element selected from the group consisting of silicon, germanium, hafnium, niobium, platinum, gold, aluminum, chromium, boron, zirconium, titanium, iron, nickel, cobalt, and vanadium, and wherein the at least one additional element comprises up to about 20 atomic percent of the first component.

60. The method of claim 55, wherein the step of providing a braze to the interface between the first piece and the second piece comprises providing a braze having a first component comprising between about 45 and about 90 atomic percent zirconium with the balance comprising one of platinum and vanadium.

61. The method of claim 60, wherein the first component of the braze further comprises at least one additional element selected from the group consisting of silicon, germanium, hafnium, niobium, platinum, palladium, gold, aluminum, chromium, boron, titanium, iron, nickel, cobalt, and vanadium, and wherein the at least one additional element comprises up to about 20 atomic percent of the first component.

62. The method of claim 55, wherein the step of providing a braze to the interface between the first piece and the second piece comprises providing a braze having a first component comprising between about 15 and about 80 atomic percent niobium with the balance comprising a metal selected from the group consisting of iron, nickel, and cobalt.

63. The method of claim 62, wherein the first component of the braze further comprises at least one additional element selected from the group consisting of silicon, germanium, hafnium, palladium, platinum, gold, aluminum, chromium, boron, titanium, iron, nickel, cobalt, and vanadium, and wherein said at least one additional element comprises up to about 20 atomic percent of said first component.

64. The method of claim 55, wherein the step of providing a braze to the interface between the first piece and the second piece comprises providing a braze having a first component comprising between about 15 and about 80 atomic percent hafnium with the balance comprising iron.

65. The method of claim 64, wherein the first component of the braze further comprises at least one additional element selected from the group consisting of palladium, gold, niobium, aluminum, chromium, boron, cobalt, nickel, and vanadium, and wherein said at least one additional element comprises up to about 20 atomic percent of said first component.

66. The method of claim 55, wherein the step of providing a braze to the interface between the first piece and the second piece comprises providing a braze having a first component comprising one of germanium and silicon, and one of chromium, titanium, gold, aluminum, palladium, platinum, and nickel.

67. The method of claim 66, wherein the first component of the braze has a melting temperature between about 360° C. and 1430° C.

68. The method of claim 67, wherein the first component of the braze further comprises at least one additional element selected from the group consisting of platinum, palladium, gold, silicon, germanium, titanium, niobium, hafnium, aluminum, iron, cobalt, zirconium, vanadium, chromium, and boron, and wherein the at least one additional element comprises up to about 20 atomic percent of the first component.

69. The method of claim 55, wherein the article is one of an airfoil, a diffuser, a casing, and a seal ring structure.

70. The method of claim 69, wherein the article is an airfoil.

71. The method of claim 70, wherein the airfoil is a double-walled airfoil.

72. The method of claim 55, wherein the article has a melting temperature of at least about 1700° C.

* * * * *